US010191754B2

United States Patent
Deng et al.

(10) Patent No.: US 10,191,754 B2
(45) Date of Patent: Jan. 29, 2019

(54) VIRTUAL MACHINE DEVICE HAVING KEY DRIVEN OBFUSCATION AND METHOD

(71) Applicant: KONINKLIJKE PHILIPS N.V., Eindhoven (NL)

(72) Inventors: Mina Deng, Shanghai (CN); Paulus Mathias Hubertus Mechtilds Antonius Gorissen, Eindhoven (NL); Milan Petkovic, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 261 days.

(21) Appl. No.: 14/366,283

(22) PCT Filed: Dec. 27, 2012

(86) PCT No.: PCT/IB2012/057739
§ 371 (c)(1),
(2) Date: Jun. 18, 2014

(87) PCT Pub. No.: WO2013/104969
PCT Pub. Date: Jul. 18, 2013

(65) Prior Publication Data
US 2014/0380311 A1 Dec. 25, 2014

Related U.S. Application Data

(60) Provisional application No. 61/584,335, filed on Jan. 9, 2012.

(51) Int. Cl.
G06F 9/455 (2018.01)
G06F 21/14 (2013.01)
G06F 21/62 (2013.01)

(52) U.S. Cl.
CPC .......... *G06F 9/45533* (2013.01); *G06F 21/14* (2013.01); *G06F 21/6245* (2013.01)

(58) Field of Classification Search
CPC .................................................. G06F 9/45533
See application file for complete search history.

(56) References Cited

U.S. PATENT DOCUMENTS

2005/0069131 A1    3/2005    De Jong

FOREIGN PATENT DOCUMENTS

| WO | WO2009109880 A1 | 9/2009 |
| WO | WO2009109884 A1 | 9/2009 |

OTHER PUBLICATIONS

ENISA, "Cloud Computing Benefits, Risks and Recommendations for Information Security," The European Network and Information Security Agency (ENISA), Nov. 2009.
(Continued)

*Primary Examiner* — Simon P Kanaan
(74) *Attorney, Agent, or Firm* — Larry Liberchuk

(57) ABSTRACT

A virtual machine device 100 comprising multiple operation routines 122,124, 126 each configured to perform a particular instruction, and a selector 110 configured to receive an encoded instruction, the encoded instruction being obtained by encoding a plain instruction with a code encoding, the selector is configured to select and activate a corresponding operation routine of the multiple operation routines, the corresponding operation routine is configured to perform the plain instruction corresponding to the encoded instruction, the selector 100 comprises a look-up means for looking-up an encoded instruction to select the corresponding operation routine.

16 Claims, 9 Drawing Sheets

(56) References Cited

OTHER PUBLICATIONS

S. Chow et al., "A White-Box DES Implementation for DRM Applications" Oct. 15, 2002, Pre-proceedings for ACM DRM-2002 workshop, Cloakware Corporation, Ottawa, Canada, Digital Rights Management of the Lecture Notes in Computer Science 2003.

Mell P. et al., "The NIST Definition of Cloud Computing (Draft) Recommendations of the National Institute of Standards and Technology, The NIST Definition of Cloud Computing", NIST National Institute of Standards and Technology, U.S. Department of Commerce, Special Publication 800-145 (Draft), Sep. 2011.

Souppaya M. et al., "Guide to Security for Full Virtualization Technologies", NIST National Institute of Standards and Technology, U.S. Department of Commerce, Special Publication 800-125, Jan. 2011.

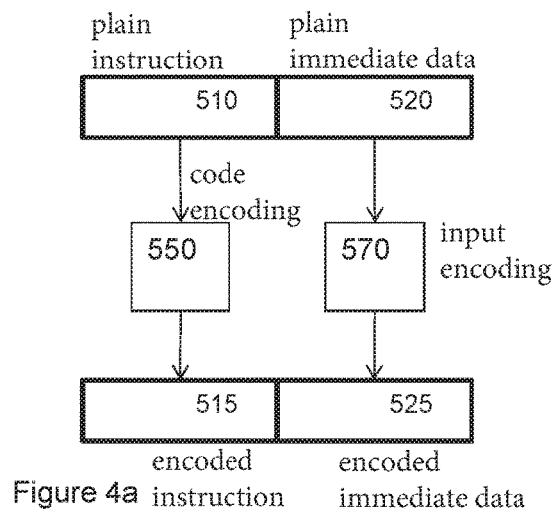
Figure 4a
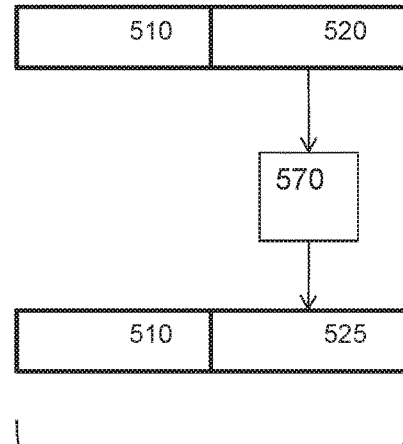
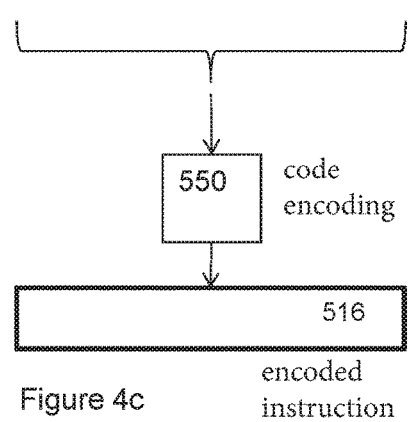
Figure 4c
Figure 4b 600  virtual machine method

VIRTUAL MACHINE DEVICE HAVING KEY DRIVEN OBFUSCATION AND METHOD

FIELD OF THE INVENTION

The invention relates to a virtual machine device configured to execute a received sequence of instructions.

The invention also relates to a method for executing a received sequence of instructions.

BACKGROUND OF THE INVENTION

In recent years, cloud computing has become a new consumption and delivery model inspired by consumer Internet services. Cloud computing is a service model for IT provision, often based on virtualization and distributed computing technologies and typically on-demand. For an introduction to cloud computing, see ENISA, "Cloud computing benefits, risks and recommendations for information security," The European Network and Information Security Agency (ENISA), 2009 November.

Benefits of cloud computing architectures include highly abstracted resources, near instant scalability and flexibility, near instantaneous provisioning, shared resources (e.g., hardware, database, memory), 'service on demand' usually with a 'pay as you go' billing system, programmatic management, e.g., through Web service API. With cloud computing, companies can instantly scale up to the computation or storage capacities on demand without having to invest in new infrastructure.

Cloud computing supports the infrastructure layered concept by incorporating three service models, namely Software as a Service (SaaS), Platform as a Service (PaaS), and Infrastructure as a Service (IaaS).

Cloud Infrastructure as service (IaaS) provides virtual machines and other abstracted hardware and operating systems which may be controlled through a service API. The capability provided to the subscriber is to provision processing, storage, networks, and other fundamental computing resources where the consumer is able to deploy and run arbitrary software, which can include operating systems and applications. IaaS is easier to understand if we refer it as Hardware as a Service. We categorize Hardware as a Service into (i) Computation as a Service (CaaS) that offers virtual machine based servers; and (ii) Data as a Service (DaaS) that offers data storage space.

Cloud Platform as a service (PaaS) allows customers to develop new applications using APIs deployed and configurable remotely. The platforms offered include development tools, configuration management, and deployment platforms. The capability provided to the consumer is to deploy onto the cloud infrastructure consumer-created or acquired applications created using programming languages and tools supported by the provider. The PaaS model typically operates one level above IaaS. The OS environment and an application development framework are already offered, while PaaS operates with an application environment.

Software as a service (SaaS) is software provided to the consumer enables use of the provider's applications running on a cloud infrastructure. The applications are accessible from various client devices through a thin client interface such as a web browser. The consumer does not manage or control the underlying cloud infrastructure including network, servers, operating systems, storage, or even individual application capabilities, with the possible exception of limited user-specific application configuration settings.

One feature of cloud computing is the capacity to virtualize and share resources among different applications, for example, to maximize the return on investment for machine utilization. Unlike the non-virtualized environment where each application runs on its own servers, virtualization enables one host machine to be virtualized to support multiple independent operating systems and applications. This may result in cost savings, e.g., of a subscriber for hardware acquisition and maintenance costs.

Virtualization is the simulation of the software and/or hardware upon which other software runs. A virtual machine, referred to as VM is a simulated environment created by virtualization. Virtual machines are managed by virtual machine monitor (VMM), also referred to as a 'hypervisor'. A hypervisor is a virtualization component that manages the guest OSs on a host machine and controls the flow of instructions between the guest OSs and the physical hardware.

Cloud computing is a new model for delivering computing resources, such as networks, servers, storage, or software applications. Cloud computing is used increasingly. However, certain market sectors which deal with sensitive data, such as healthcare, are hesitant due to privacy and security concerns. Storing sensitive data and/or applications in the cloud raises legal, business and ethical issues. Not only confidentiality of data is a concern, also that of software. For example, if an application stored in a commodity public cloud is executed with a standardized virtual machine (VM), the data can be disclosed and the execution of the application can be observed.

SUMMARY OF THE INVENTION

Benefits of cloud computing often suffer from concerns about trust, privacy and security. This is especially the case in the domain of healthcare which deals with very sensitive health data and where liability plays a very important role. Privacy breaches on the cloud which involve the disclosure of many records of patient data are critical for many companies and healthcare providers. Simply encrypting the data and storing encrypted data on the cloud creates many limitations as the keys have to be also stored on the cloud to allow for processing of the data. This creates a potentially exploitable vulnerability. Furthermore, by moving the applications which do the data processing on the cloud many companies are worried that their algorithms and methods will be disclosed and that they will lose distinguishing features and competitive advantage (take 'Clinical decision support' (CDS) inference algorithms and knowledge as an example). Given the aforementioned issues, many companies and public authorities still hesitate to use the benefits of cloud computing, waiting for solutions that will enhance trust, confidentiality and security of cloud solutions.

An advantageous virtual machine device comprises multiple operation routines each configured to perform a particular instruction, and a selector configured to receive an encoded instruction. The encoded instruction has been obtained by encoding a plain instruction with a code encoding. The selector is configured to select and activate a corresponding operation routine of the multiple operation routines. The corresponding operation routine is configured to perform the plain instruction corresponding to the encoded instruction. The selector comprises a look-up means for looking-up an encoded instruction to select the corresponding operation routine.

'Plain' refers to 'plaintext', i.e., non encoded or encrypted text. For example plain code is non-encoded/non-encrypted code.

Typically, the selector will be configured to receive a sequence of encrypted instructions, the sequence of encrypted instructions being obtained by encrypting a sequence of plain instructions with a code encoding. The selector is then configured to iteratively select a next encrypted instruction of the sequence of encrypted instructions and to activate a corresponding operation routine of the multiple operation routines, which corresponding operation routine is configured to perform a plain instruction corresponding to the selected next encrypted instruction.

In the known approach of virtualization, data and the execution of the virtual machine on the cloud is observable by both external adversaries and malicious insiders, e.g., the cloud service provider. This observability and information disclosure of computation process can be problematic if one wants to ensure:
1. Confidentiality of data on the cloud (e.g. patient health data uploaded to the cloud)
2. Private execution of the virtualized programs or operating systems to ensure protection of intellectual property of the algorithms in the programs
3. Binding of data to a certain VM and application, so that only specific VMs and applications can decrypt the data stored on the cloud This invention addresses the technical enforcement of the confidentiality and unobservability of data, applications and virtual machines running on the cloud, as well as binding of data to virtual machines and applications.

Data and code are linked to the VM in such a way that none or limited knowledge is observable from the input and code. Also output may be linked to the VM so that knowledge extracted from the VM's output is limited too.

This invention disclosure enables the cloud users to significantly reduce the risks of privacy breaches on the cloud, by keeping the data and/or application code on the cloud encrypted. Encryption keys are protected on the cloud hiding and binding them to the virtual machine and application running on top of it. Input, semantics, and output of the application are difficult (hard) to reconstruct. Reconstructing the semantics of a program in general is a cumbersome task. For a VM linked through coding and recoding to an application, i.e., without access to semantics of the instruction, this could take years.

The invention and many of the preferred embodiments make use of encodings (such code encodings, input encoding, output encoding, internal encodings etc). An encoding is a bijection (also known as a bijective function or one-to-one correspondence), that maps a range of integer numbers to the same range. The range, typically, starts with 0, and, typically, goes up to a power of two minus 1. The integer numbers may represent data or instructions. The inverse of an encoding is denoted as a decoding.

Encodings include encryptions, e.g. with a particular typically fixed key. For example, an encoding may be an implementation of cipher, e.g. a block cipher. Preferably, a white-box implementation of a cipher used as an encoding is used.

An important property of an encoding is that if an encoding is composed with a table T, they seamlessly merge together into a new table. If the encoding is denoted as O, the new table would be one of ($O \circ T$, $T \circ O^{-1}$). The same holds for a table network, denoted as WB, which becomes one of ($WB[E_k] \circ T$, $T \circ WB[D_k]$).

Advantageously an encoding is implemented as a table. The advantage of using a table is that if a subsequent operation is to be performed which is also expressed as a table, than the tables may be merged into a new table, obtained by applying the one table after the other.

Encodings may also be expressed as encryptions for a particular key. This simplifies implementation somewhat. For example, the code encoding may be obtained as encryption with an encryption key.

The look-up table means is preferably a look-up table. However, such a table may be implemented in various forms; for example, as a long sequence of if/then/else statements, or as a case statement with many branches.

In an embodiment, the look-up means takes an encoded instruction as an index and produces a pointer to the correct corresponding routine. The pointer to the corresponding operation routine may be used to activate the corresponding operation.

In a further embodiment, also immediate data is produced for use by the corresponding routine.

A look-up means could be a lookup table for example, a list of the items which are to be looked-up sorted according to the index. In the case above, the look-up table could be a list of pointers to the correct corresponding routine sorted according to the encoded instruction. In this way the table needs only one column. If some encoded instructions are not used, they may be represented with a dummy pointer, e.g. all zero.

The look-up means may also be a table with two (or more) columns, e.g., the first containing the index, e.g. the encoded instruction, the second the looked-up object, e.g. the corresponding pointer.

In an embodiment, the look-up table may be obtained by re-ordering a look-up table of a regular virtual machine device which is configured to receive the plain instructions. Interestingly, an explicit decryption or decoding operation are avoided by combining the decoding of encoded instructions with parsing instructions to obtain the correct operation.

The encoded instruction may be obtained by only encoding the instruction. This gives a small look-up means. For example, if there are 256 possible instructions, the look-up means may be implemented as a look-up table of size 256 times the size of a pointer.

However, the encoded instruction may also be obtained by encoding the plain instruction together with immediate data. This will give a larger look-up means. For example, if the immediate data is one byte, then the look-up means may be implemented as a look-up table of size 256*256 times the byte-size of a pointer+1.

Although this will enlarge the look-up means, the amount of obfuscation is greatly increased. There will no longer be a fixed relation between instructions and particular lines in the table.

Immediate data is data which is included in a code stream on which an instruction is to act, and includes constants, parameters or operands on which the operation to which the instruction corresponds is to act.

The immediate data may include a single data item, e.g., for a negation operation. The immediate data may include multiple data items, e.g., two data items, e.g. for addition.

As an example, the encoded instruction was obtained by encoding the plain instruction together with the immediate data in a single block of a block cipher.

Note that an encoded instruction may also be obtained by encoding a first part of the immediate data together with the instruction without a second part of the immediate data. This will keep the size of tables down. The second part may be encoded with the input encoding. The input encoding may be recoded to an internal encoding, but may also be left on the instruction, in which case the operation routine may be adapted to receive the second part encoded with the input encoding. Especially, if the immediate data is part of a code channel, i.e. code stream or code sequence, then this latter option is preferred as it avoids the need to parse the code.

The immediate data could be encoded with an input encoding, before being encoded with the code encoding together with the plain instruction.

In an embodiment, the virtual machine device comprises an input recoder configured to receive further data for use by an operation routine, the further data being encoded with an input encoding, the input recoder being configured to decode the data with an input decoding, and encode with an internal encoding. For example, the input recoder may contain a lookup-means for looking up encoded further data and to find in the table the re-encoded further data. For example, the code may represent a proprietary algorithm for analyzing medical data, say pictures; the further data may represent the medical data itself.

The input recoder may be configured to receive operands for use by an operation routine. The input recoder may comprise a decryptor configured to decrypt with an input decryption key. The decryptor may be a white-box decryptor. The result of input recoding is typically stored in a memory of the virtual machine device.

In an embodiment, the virtual machine device comprises an output recoder configured to receive data results produced by an operation routine. The output recoder being configured to recode the data results encoded with an internal decoding to data results encoded with an output encoding.

Recoders such as input recoders, output recoders, internal recoders etc may be obtained by applying first a decoding operation, followed by an encoding operation. Note that these two operations may be merged into a single operation, say a single look-up means, such as a look-up table.

The output recoder could comprise an encryptor configured to encrypt with an output encryption key. The encryptor may be a white-box encryptor.

Risks of data and algorithmic IP disclosure are diminished by merging encodings with the (optional) input function of the VM, the decoder of the VM, or/and the (optional) output function of the VM. The data and the applications are encrypted on the cloud, while the keys are unknown (in case the encoding corresponds to encryptions). In case of an obfuscation, such as through a random bijection, the attacker doesn't know what a data item 'k' represents since 'k' is just the $k^{th}$ element of an unknown obfuscation set to him.

In an embodiment, the multiple operation routines, and/or in particular the corresponding operation routine, are configured to receiving data encoded with a first encoding and to produce a result encoded with a second internal encoding, the encoded result being obtained by:

decoding the encoded data with a first decoding,
performing the plain instruction corresponding to the encoded instruction on the decoded encoded data to obtain a result,
encoding the result with a second internal encoding.

Preferably, the decoding, performing and encoding steps are combined into a single table, or table network.

The first encoding may be an internal encoding. The second internal encoding may be the same encoding as the first encoding. The first encoding may be the input encoding.

In an embodiment the virtual machine device comprises one or more recoding instructions. For example, they may be compositions of tables $\{O^{-1}_k$ and $O_1\}$, $\{O_k$ and $O^{-1}_1\}$, or table-networks $\{Wb[E_k]$ and $Wb[D_1]\}$, $\{Wb[E_1]$ and $Wb[D_k]\}$.

The data encoded with a first encoding is any one of the following: encoded immediate data, data encoded with an internal encoding obtained from a memory of the virtual machine, data encoded with an internal encoding obtained from a register of the virtual machine device, received data encoded with the input encoding.

The corresponding operation routine may be implemented as a look-up means, e.g., a look-up table, or a as a table-network. The look-up means is configured for looking-up an encoded data to obtain the result. Such a table may be compiled by listing the outcome of the operation for every possible input.

If the operation is an unconditional jump, no look-up table may be needed. Note that the encoding of code and/or data may be advantageously combined with encoding of the address space. This only needs an encoding of addresses and a corresponding reordering of the code. It has the result that the code making up the operation will be spread over the code. An operation for a conditional jump may include a look-up means taking as input the operand to which the conditional relates and a single output bit which indicates if the jump is to be taken or not (or a table of targets given an input).

If the operation acts on data such as immediate data or data from memory/registers, the table may be produced by performing the operation for all such data. The table may be preceded with a decoding table for removing an encoding to the immediate data. The table may be followed by an encoding, say an internal encoding.

If the operation requires a move or writing of data, such operation may be done as usual, taking into account address encoding if such is used.

The plain instructions may correspond to java byte code. Also Java cup' may be used.

A further aspect of the invention is an instruction encoder configured to encode instructions with a code encoding, and optionally, to encode data with an input encoding. The instruction encoder may be part of a compiler or preferably, a linker say as part of a post linking step. Note the post linking step may use at least two keys one for the immediate data and one to encrypt the instructions.

For example, the immediate date of the instructions may be encrypted with an input key, or keys, after this has taken place the instructions, now containing encrypted immediate data are encrypted by the instruction key.

A further aspect of the invention is distributed execution system comprising an instruction encoder and a virtual machine device.

A further aspect of the invention concerns a virtual machine method. The virtual machine method comprising receiving an encoded instruction, the encoded instruction being obtained by encoding a plain instruction with a code encoding, looking-up the encoded instruction to select a corresponding operation routine of multiple operation routines, the corresponding operation routine is configured to perform the plain instruction corresponding to the encoded instruction, and activating the corresponding operation routine.

In an embodiment the method comprises obtaining a sequence of encrypted instructions by encoding each one of a sequence of plain instructions with a code encoding, e.g. encrypting each one of a sequence of plain instructions with a code encryption key.

Several cloud computing use cases are possible. For example, shifting data to the cloud reduces hardware while retaining privacy protection. For example, privacy sensitive information, such as patient data, could be stored in the cloud. To avoid leakage of the sensitive data, the entire processing of the data may be executed in the encrypted domain, i.e., by using encrypted instructions and data. Preferably both input and output data of the VM is encrypted.

A distributed execution system, may also include a receiver to receive results from the virtual machine device. The receiver may include an output decoder to remove output encoding of the virtual machine device. For example, the receiver may be placed at a hospital using the virtual machine device to process medical data.

The virtual machine device may be embedded in an electronic device, in particular a server. The virtual machine device may also be embedded in mobile devices, e.g., mobile phone, set-top box, computer, tablet, etc.

The virtual machine device may be embedded in a security token. The security token comprising a virtual machine device, and configured to receive: code to execute a challenge-response protocol, and a challenge. The code is encoded with the code encoding, the challenge with the input encoding. The security token may thus be implemented in software and run in an untrustworthy environment A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer In a preferred embodiment, the computer program comprises computer program code means adapted to perform all the steps of a method according to the invention when the computer program is run on a computer. Preferably, the computer program is embodied on a computer readable medium.

BRIEF DESCRIPTION OF THE DRAWINGS

The invention is explained in further detail by way of example and with reference to the accompanying drawings, wherein:

FIGS. 4a, 4b, 4c, 4d and 4e illustrate various ways of encryption code and/or data.

Throughout the Figures, similar or corresponding features are indicated by same reference numerals.

Figure 1A:
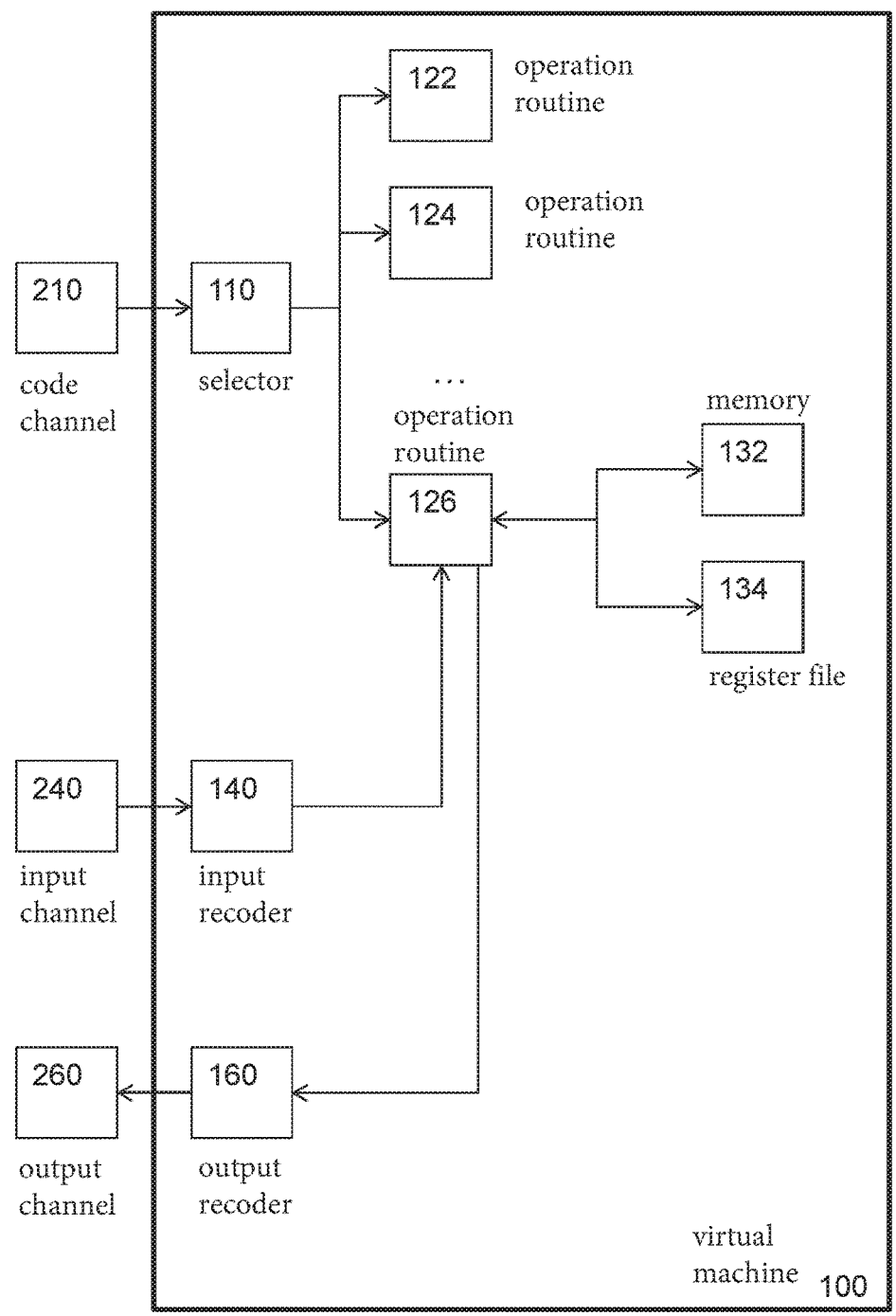
FIG. 1a is a block diagram illustrating a virtual machine according to the invention.

| List of Reference Numerals: | |
|---|---|
| 100 | a virtual machine |
| 110 | selector |
| 122, 124, 126 | operation routines |
| 125a | pre-coder |
| 125b | operation |
| 125c | post-coder |
| 132 | a memory |
| 134 | a register file |
| 140 | an input recoder |
| 160 | an output recoder |
| 210 | a code channel |
| 222, 224 | a user device |
| 230 | a server |
| 240 | an input channel |
| 260 | an output channel |
| 310 | an input table |
| 320 | an intermediate table |
| 330 | an output table |
| 412 | a plain code channel |
| 414 | a code encryptor |
| 422 | a plain input channel |
| 424 | an input encryptor |
| 462 | a plain output channel |
| 464 | an output decryptor |
| 510 | a plain instruction |
| 515, 516, 517 | an encoded instruction |
| 520 | plain immediate data |
| 525, 526 | encoded immediate data |
| 521 | further immediate data |
| 550 | a code encoding |
| 570 | an input encoding |
| 710, 720, 730, 740, 750, 760 | a look-up table |
| 600 | a virtual machine method |
| 610 | receiving an encoded instruction |
| 620 | looking-up the encoded instruction to select a corresponding operation routine of multiple operation routines |
| 630 | activating the corresponding operation routine |

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

White-box Cryptography

The invention could make use of white-box cryptography. White-box cryptography addresses threats in the white-box model. The white-box attack model is used to analyze algorithms that are running in an untrustworthy execution environment, i.e., an environment in which applications are subject to attacks from the execution platform.

One can distinguish three main attack models that capture the attack capabilities of an adversary on cryptosystems. These are the following:

The black-box model ensures that an adversary has only access to the functionality of a cryptosystem, and it is the traditional attack model.

The grey-box model allows the adversary to deploy side-channel cryptanalysis techniques, by a leakage function.

The white-box model allows the adversary has total visibility of the software implementation of the cryptosystem, and full control over its execution platform. The white-box model can be referred as the worst-case model.

The attack model of white-box therefore requires special precautions to answer to these has conditions. There exists white-box implementations for various algorithms; these may be used in the invention. For example of the block ciphers DES and AES, both for encryption and decryption, white-box implementations are available.

A disadvantage of existing white-box implementation is that they are only suitable for one purpose, encryption or decryption, typically only for one particular key. The invention provides a virtual machine which allows execution of arbitrary code yet still provides security in the white-box attack model.

White-box may be used in the invention, for example any one of the input decoding. But a white-box cipher and virtual machine according to the invention are quite different. A white-box cipher cannot run code.

A white-box encryption or decryption primitive typically implements a cipher, such as a symmetric cipher. Preferably, a white-box implementation of a block ciphers is used. For example, any one of the input recoder (possibly one or both of the input decoding, internal encoding), output recoder, (possibly one or both of the internal decoding, output encoding) or the recoding instructions may be implemented as or comprise a white-box encryption or decryption.

A white-box cipher is a software implementation wherein the secret key is instantiated. The goal is that the effort of the white-box cipher is at least as large as a black box (e.g. brute force) attack on the underlying cipher. One ideal solution would be to implement the cipher as one big lookup table. However, this is unworkable for practical bock cipher. A white-box strategy that approaches this ideal was introduced in "A White-Box DES Implementation for DRM Applications" by S. Chow, P. Eisen, H. Johnson, and P. C. van Oorschot, 2002 [42,43] published in the book Digital Rights Management of the Lecture Notes in Computer Science 2003. Computations, in particular block ciphers may be implemented as a network of lookup tables, randomized so that key information is spread over the entire network. Every building block may be made to be seemingly independent from the key. So that an adversary is forced to analyze the complete network in order to obtain secret key information. Obfuscation of the network of tables is possible by prepending and appending obfuscating transformations to the transformations written out in table. In this way each individual table is randomized, while the combination of all obfuscating transformations cancels.

Figure 3:
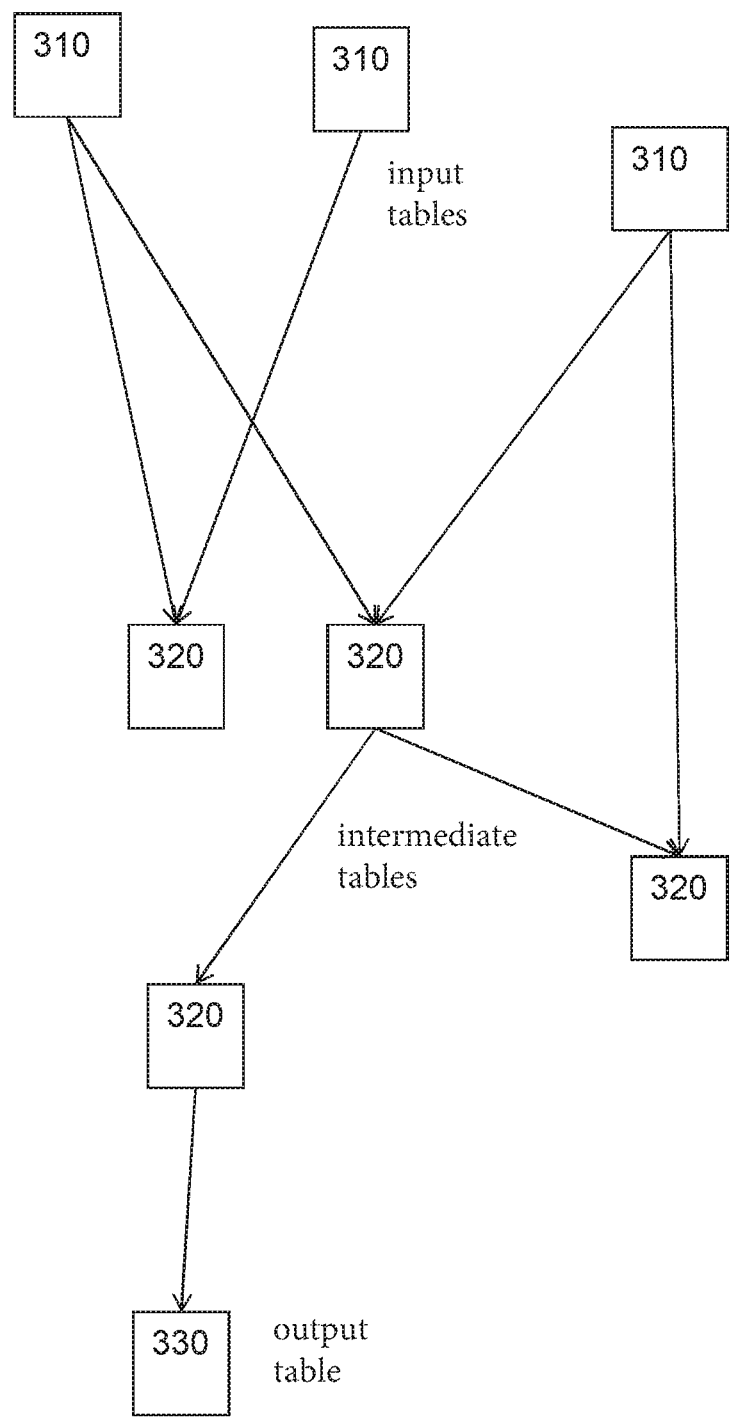
FIG. 3 is a block diagram illustrating a white-box cipher.

FIG. 3, illustrates a network of tables. Most functions may be expressed as a network of tables. For example, the network of tables, may be a white-box implementation, e.g. of a cipher. Shown are 8 tables of multiple tables. A table transforms an input value to an output value by table-lookup of the input value. Shown are three of the input tables 310, for receiving input from outside the white-box implementation. Shown is one of the output tables 330. The output tables 330 together form the output of the white-box implementation, e.g. by concatenation. Shown are four tables of the intermediate tables 320, who receive at least one input from another one of the tables, and who produce an output for use as an input for at least one other table. The tables 310, 320 and 330 together form a network. The cipher may be a block cipher; the block cipher may be configured for encryption or for decryption. The block cipher encrypts a block cipher, say AES, for a particular key; the tables depend on the particular key.

FIG. 1a is a block diagram illustrating a virtual machine 100. Virtual machine 100 receives code from a code channel 210, input data from an input channel 240 and produces output to an output channel 260. In this description the channels are abstracted. Virtual machine 100 is typically implemented in software and running on a computer (not shown).

From code channel 210, the virtual machine 100 receives a sequence of operations, also known as instructions. For example, the instructions may be byte code, e.g. java byte code, or 8086 assembly instructions. For example, code channel 210 may be an input for receiving code from a network, such as the internet, or a file server whereupon a code file is stored. The code may be stored at the same computer where virtual machine 100 is hosted. Typically, the operations are represented as data items, e.g. code words. For ease of discussion, we abstract the precise origin of the operations, as code channel 210.

Virtual machine 100 comprises a selector 110. Selector 110 reads an operation from the sequence of operations received from code channel 210 and determines an appropriate operation routine for executing the operation. Selector 110 may be implemented as a so-called 'case' statement. Such a case statement receives as input the operation, e.g., represented as a numerical operand, and as output jumps to an appropriate routine for execution. Alternatively, selector 110 may be implemented as a sequence of comparison statements, testing equality between the received operation and the operation represented by the operation routines. If the comparison statement is successful, i.e., if there is equality, then control may be transferred to the corresponding operation routine, e.g., by a go-to command.

Of the multiple operation routines in virtual machine 100 there are shown in FIG. 1a the operation routines 122, 124 and 126. As an example, operation routine 126 has been drawn in more detail. However routines 122 and 124 are configured likewise as operation routine 126. Selector 110 starts execution of an operation routine depending on the operand received from code channel 210. As an example, we will assume, operation routine 126 is selected by selector 110. Note that if address encryption is used, the original addresses of the operation routines, including routines 122, 124 and 126 just become other addresses.

In the embodiment of FIG. 1 we assume that all encodings are implemented as encryptions, e.g., as symmetric encryption for a particular key. Expressing an encoding as an encryption provides for an efficient way to select random bijections. In the case encryption is used for an encoding, we will sometimes use the term encryptor instead of encoder, and decryptor instead of decoder. However, it not necessary to restrict the encoding to any particular encryption, especially if encodings, decoding and recodings are implemented with look-up means one may also any random bijection; for example a random bijection, or a bijection having special properties, for example, part of the bijection may depend on properties of the underlying hardware on which the virtual machine device is implemented.

The operations that are received from code channel 210 are already encrypted with an encrypting cipher, e.g., by a code encryptor 414, under the control of a secret key. For example, a block cipher may be used to encrypt the code, e.g., in codebook mode.

Figure 6:
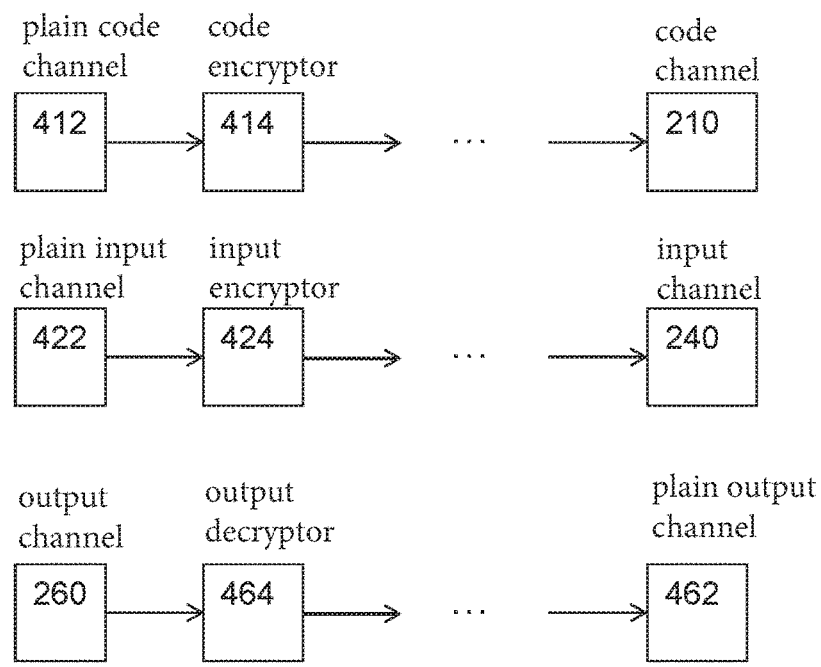
FIG. 6 is a block diagram illustrating encryption of code, data and decryption of output.

FIG. 6 illustrates this. Before using the VM, plain code is encrypted with a code key, i.e. key k, e.g., by first creating plain code, i.e., a sequence of plain instructions, here represented as plain code channel 412. The operations are encrypted by code encryptor 414, resulting in encrypted operations, which may be used on code channel 210. Preferably, encrypting the code is done after compilation, e.g., during linking To compensate for the encryption of the operations, interestingly a corresponding decoding step is not explicitly needed in the VM 100. For example, the multiple operation routines may be shuffled such that in response to the encrypted operations selector 110 selects the correct operations routine. If a white box implementation is used for the operation routines then reconstructing the correct operation from the encrypted operation will be hard. After that the case labels may be reordered, e.g., sorted.

Preferably, the code encryptor 414 encrypts from a range of values representing all possible operations, to the same range. Alternatively, a small range encryptor may be used; for example, if a byte code is used, a byte sized block cipher may be used. Also a 16 bit size block cipher may be used. For example, code encryptor 414 may encrypt a plain instruction represented as words of a fixed bit size to encrypted instructions represented as words of the same bit size; typical bit sizes include 4, 8, 16, and 32. For example, a block cipher may be adapted from longer block sizes to smaller. For example, a Feistel cipher, such as DES, may be adapted by truncating the round function to half the desired block size. For example, AES may adapted by restricting each round to the desired number of bytes or words. An example, one could have the code encryptor 414 use codebook mode.

FIG. 6 also shows a plain input channel 422 and an input encryptor 424. The input encryptor 424 may be used to encrypt plain input before sending it the virtual machine device 100. FIG. 6 also shows an output decryptor 464 which may be used to decrypt output of the virtual machine device 100.

FIG. 1a, further shows a memory 132 and a register file 134. The operation routines, e.g. operation routine 126, may read or write to local temporary, or non-volatile, storage.

The operation routines, e.g. operation routine 126, may need one or more operands for the operation they implement. Virtual machine 100 has access to an input channel 240. Again multiple alternatives are possible for input channel 240, especially in the cloud. For example, virtual machine 100 may receive input via other computers, utilizing distributed storage, or computing. Virtual machine 100 may receive input from a user, etc. The input to virtual machine 100 may or may not be encrypted. The input may be recoded by input recoder 140 towards an encoding used internally by the operation routines. If the operation routines work further on intermediate results, stored, typically temporarily, memory 132 or register file 134 do not normally need re-coding since they are already stored in the encoding used by operation routine 126. White-box cryptography, and obfuscation pairs are especially suited for encoding, decoding en recoding.

The operation routines, e.g. operation routine 126, may use for their operation one or more operands. Virtual machine 100 has access to an input channel 240. Again multiple alternatives are possible for input channel 240, especially in the cloud. For example, virtual machine 100 may receive input via other computers, utilizing distributed storage, or computing. Virtual machine 100 may receive input from a user, etc. The input to virtual machine 100 may or may not be encrypted. The input may be recoded by input recoder 140 towards an encoding used internally by the operation routines. If external encoding is the same as internal encoding of inputs, i.e. operands, or if encryption of input data is not used, then input recoder 140 may be omitted.

The operations routines may also produce data for export, i.e. output of virtual machine 100. Output is sent to an output channel 260. Output may be exported from virtual machine 100 in a number of ways. For example, the output results may be send to another computer, e.g., the same computer from which input was received, e.g. over the network. The output may be written to a file, possibly on a different computer, possibly for further use as part of distributed computing and/or storage. The output of virtual machine 100 may or may not be encrypted. If the virtual machine 100 does not use internal encryption, e.g., only uses encryption for code channel 210, of if virtual machine 100 uses the same encryption for output as for internal use, then output recoder 160 may be omitted. An output recoder 160 may be used to recode the data to the encryption used externally.

Code channel 210 and input channel 240 may be combined, e.g., interleaved.

Virtual machine 100 may use white-box ciphers or other encodings in various ways.

Selector 110 may be implemented as follows:

```
While (true)
Do
{
    Fetch (instruction);
    Decode (instruction);
    Execute (instruction); // incorporating Instruction = next (instruction);
}
```

To prepare an application for execution on virtual machine 100, the code, i.e. sequence of instructions, is encrypted using an encryption function E and a key k. Encryption function E may, preferably, be a block cipher. The code then becomes a sequence of encrypted instructions, that is, a sequence of E_k (instruction). E_k denotes encryption with key k. The decode operation of the main loop of the VM may be extended with a white-box implementation of the decryption function instantiated with key k, that is WB[D_k]. We denote a white-box implementation, e.g., as a network of tables, of function by enclosing the function with WB[ ].

A main loop of virtual machine 100 could look like this:

```
While (true)
Do
{
    Fetch (instruction);
    Decode (WB [Dk] (instruction));
    Execute (instruction); // incorporating Instruction = next (instruction);
}
```

Surprisingly, the composition of Decode and WB[Dk] can be 'melted' into Melted_WB_and_decoder(x)=Decode (WB[Dk] (x)). A decoding case clause which does the execution of the instruction may simply be reordered as a result of the "melting". Especially, in case the implementation of the instructions, i.e., the operation routines, have been done in white-box, or are otherwise obfuscated, this removes a possible starting point for attack of the system, namely the WB[Dk] function. Even in case no white-box is used in the operations an arbitrary reorder of the case clause can take place.

Encryption of instructions alone does not provide obfuscation of the input data or output data. In an improved embodiment: data for input channel 240 is encrypted. To compensate for this encryption, input recoder 140, e.g., as part of the instruction in the VM accessing through a read the input channel 240, is equipped with a WB[Dk' ].

In another refinement, which may be combined with the ones above, a write to an output channel of the application is encrypted with a white-box encryption WB[Ek"]. Later the result can then be obtained and decrypted, e.g., on a secure platform, using Dk"

In a yet a further improvement, the actual operation of the instruction is hidden from observation. To hide functionality of the operation a WB encryption encode and decode pair is used, that is WB[EK'''] and WB[DK''']. The functionality is enclosed by such a pair. For example, suppose the functionality of the (monadic) operation is f then the new functionality becomes new_f(x)=WB[EK'''](f(WB[DK'''](x))). If the operation is dyadic the Curry form of the dyadic operations used. By doing so all information in registers, and memory becomes encrypted by WB[EK''']. Note that for most functionality of operators (instruction semantics) the enclosing is inseparable. For simplicity one could use the above encoding through white-box only for monadic operations.

The latter has consequences for the input and output channels too. Since every operation expects the VM data to be encrypted by WB[EK'''] we have to encrypt the input channels and decrypt before we write to and output channel.

The read to an input channel will now be the composition of WB[EK'''] and WB[Dk.' ] and the write to an output channel will be the composition of WB[DK'''] and WB[Ek"]. Again note that in WB sense they are preferably composed inseparable. By inseparable it is meant that no possible partial decomposition can be made, which would reveal the obfuscation channel, register, or instructions.

The key k''' is specific for every VM. The keys k, k', k" are secrets shared between VM and application.

Below we list various options to encrypt (encode/recode) in input recoder 140, output recoder 160 and operation routine 126 operation 126b performs the actual operation, and post-coder 126c is configured for WB[Ek''']. In this manner, then internal encryption with internal encryption key k''' is first removed, then the operation is performed and then the internal encryption is applied again. However if block 126b, that perform the actual operation is implemented using a network of tables, then these may be integrated with the pre-coder 126a and post-coder 126c. In this way, the operation of operation routine 126, is fully obfuscated, even if the code itself were inspected.

Figure 7:
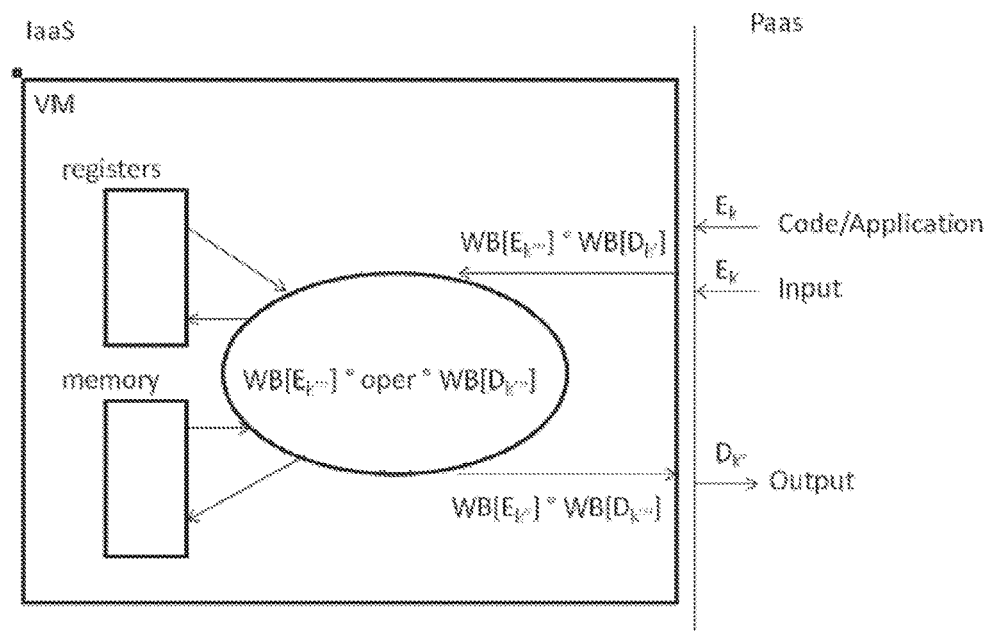
FIG. 7 is a block diagram illustrating a virtual machine according to the invention.

FIG. 7 illustrates a virtual machine wherein, code is encrypted with a key k, input with a key k', output with a key k" and internal operations with a key k'''.

The virtual machine 100 may be used in an environment of servers which can all run the VM, and use code encrypted by Ek. By doing so the code of the application is obfuscated completely through the use of white-box encryption. No code appears in the clear. The relation may be enforced by secret sharing amongst the VM and the application.

Furthermore, in the environment of servers which can run the VM, also the input channel may be encrypted with Ek'. By doing so the input channel(s) of the application is obfuscated. No input values appear in the clear. The relation may be enforced by secret sharing amongst the VM and the application.

Also, in the environment of servers which can run the VM, the output channels may be encrypted with Ek". By doing so the output channel(s) of the application is obfuscated through the use of white-box encryption. No computational values appear in the clear. The relation may be enforced by secret sharing amongst the VM and the application.

Any one of the code key k, input key k' or output key k" may be bound to a device id. For example, the key could comprise the id. This results in VM that can only be realized at device with the correct id.

FIGS. 4a, 4b, 4c, 4d and 4e illustrate various ways of encoding instructions and data. These encodings could be performed by an instruction encoder, e.g., as part of a linker, or a post-linking step.

|  | input recoder 140 | output recoder 160 | operation routine 126 |
| --- | --- | --- | --- |
| No protection | Identity | Identity | Oper |
| Only input | WB[D_k'] | Identity | Oper |
| Only operation | WB[E_k'''] | WB[D_k'''] | WB[E_k'''] o Oper o WB[D_k'''] |
| Input and operation | WB[E_k'''] o WB[D_k'] | WB[D_k'''] | WB[E_k'''] o Oper o WB[D_k'''] |
| Input, operation and output | WB[E_k'''] o WB[D_k'] | WB[E_k"] o WB[D_k'''] | WB[E_k'''] o Oper o WB[D_k'''] |

Note
'o' denotes function composition. Function composition is read from right to left.
The function on the rights is applied first, the function on the left last.
Identity denotes the identity transform (no change).
Oper denotes an operation performed in an operation routine, e.g. operation routine 126.
Also code encryption may be used with key k. The selector 110 will in that case either comprise WB[D_k] or be reordered so compensate for the encryption.

The above table assumes that only a single code key, single input key and a single internal key is used. This may be extended since also recoding instructions may used, to shift from one internal encoding to another. If the implementation uses keys, there could be more than one key. Due to recoder instructions the obfuscation can be spread between application and VM.

Figure 1B:
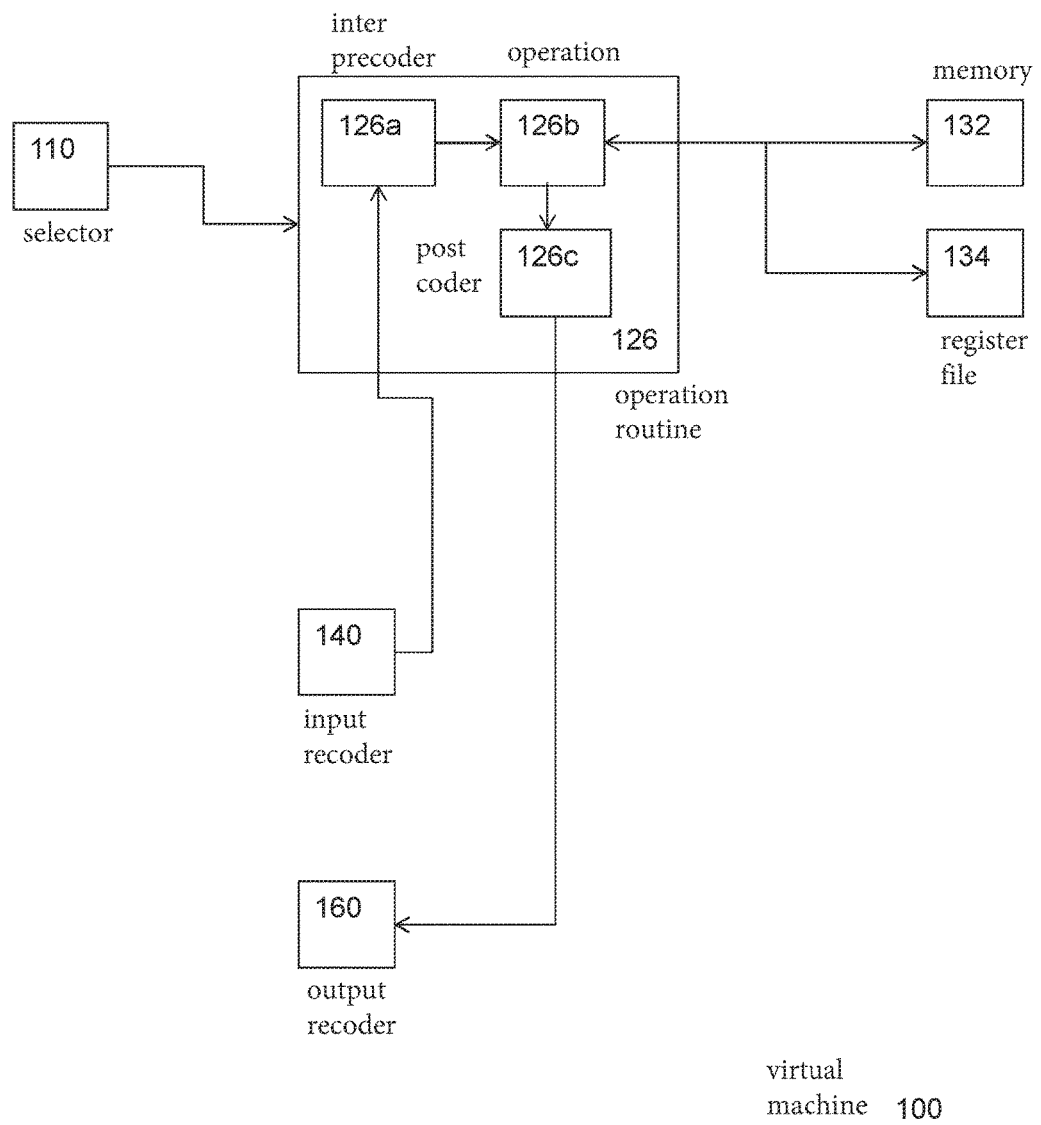
FIG. 1b is a block diagram showing a possible implementation of an operation routine, in particular of operating routine 126.
Figure 2:
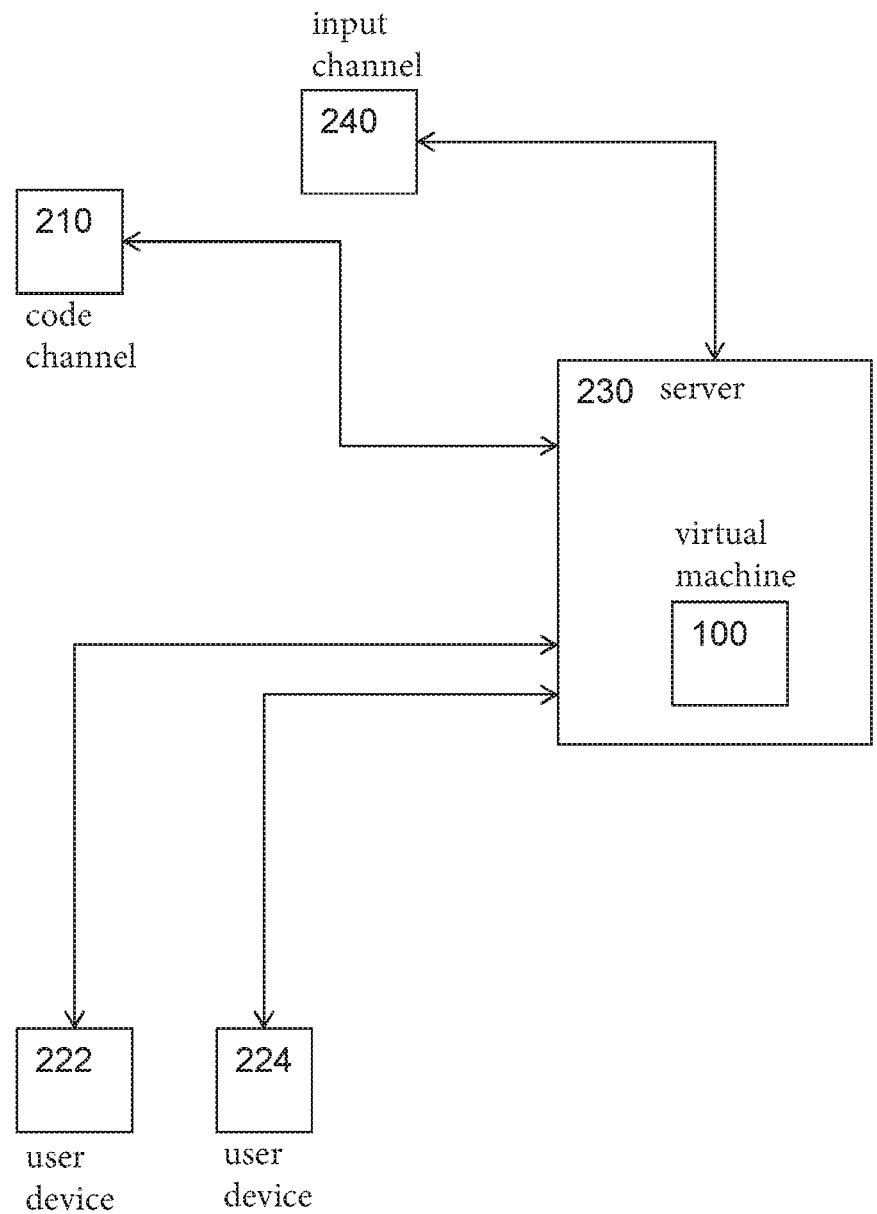
FIG. 2 is a block diagram illustrating a system using a virtual machine according to the invention.

FIG. 1b further illustrates encryption of internal operations. Inter pre-coder 126a is configured for WB[Dk'''], FIG. 4a shows a plain instruction 510, along with plain immediate date 520. The plain instruction 510 is encoded with a code encoding 550, e.g. through a code encoder 550, to obtain encoded instruction 515. The immediate data is encrypted separately with an input encoding 570, e.g. through an input encoder 570 to obtain encoded data 525. To use this type of encoding, the virtual machine only needs look-up means to map the encoded instruction to the correct operation, e.g., a pointer, and look-up means to map the encoded data to data encoded according to an internal encoding (if different from the external encoding). Thus only small tables are needed.

FIG. 4b shows an encoding type wherein the plain instruction 510 and the plain immediate data are both encoded directly with a code encryption. This will require them to be decoded together, thus higher obfuscation, but also larger tables arise. Note that if more immediate data is needed, it may be encoded separately, e.g. by input encoding. The look-up means used to decode encoded instruction 517 may be split in two tables; a first table obtains the operation routine in response to the encoded instruction, the second the immediate date. Note that the table may give the immediate data in any suitable encryption, e.g., encoded with an internal encoding.

FIG. 4c shows a third way of encoding. Here all immediate data is encoded with an input encoding. Next the instructions are encoded, possibly including immediate data or not.

Figure 4D:
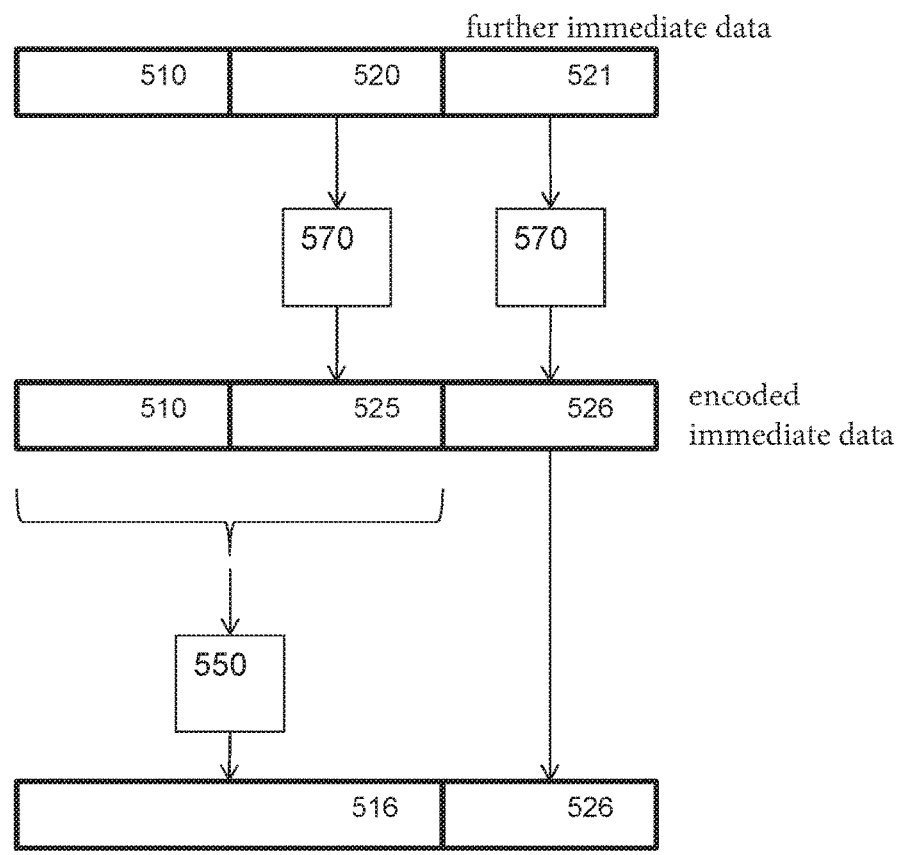

FIG. 4d shows partial encoding. The instruction 510 is assembled together with immediate data 520 and 512. As in FIG. 4c all immediate data is encoded with an input encoding 570. However, only the instruction 510 and encoded data 525 are encoded with the code encoding 550, to obtain encoded instruction 516. Encoded instruction 516 combined with encoded data 526. Partial encoding of immediate data keeps the size of tables down.

Figure 4E:
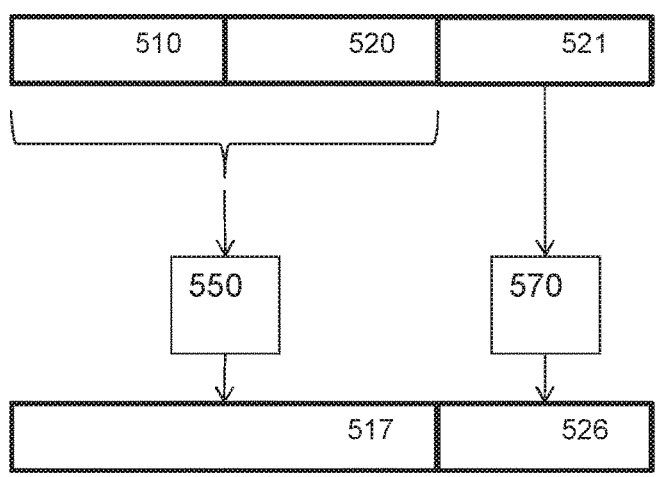

Note that partial encoding may also be done using the system of 4b. This is illustrated in FIG. 4e. Instruction 510 and immediate data 520 are encoded with code encoding to obtain encoded instruction 517. The further immediate data 521 is encoded with the input encoding.

Note that all of these encoding may be done in-place. Immediate data is typically placed adjacent to the instruction.

One may adapt the instruction set to simplify the encoding scheme. For example on may design the instruction set so that all instruction carry exactly one immediate data of predetermined size, say 1 byte, or 1 word, say 16 bit. Instructions requiring multiple operands (say additions) may take the remaining operands from a register. The remaining operands may have been placed in a register by preceding instructions. Instructions that do not require an operand may have a dummy value in the operand field.

Figure 5A:
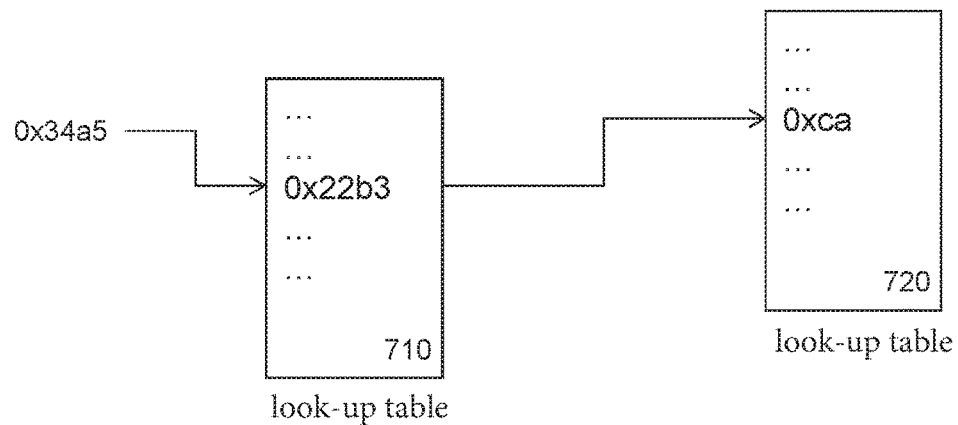
FIG. 5a illustrates an embodiment of the invention.

FIG. 5a illustrates how the selector may work. First the selector receives an encoded instruction. In this example, all instruction are of a fixed size, say 1 byte (other size are possible). In this example, the encoded instruction is encoded using the scheme of 4b or 4c. For example, the plain instruction may have been 0xaa with plain immediate data 0x12. Together they are encoded (in this example) as 0x34ab. The encoded instruction is looked-up through the look-up means (in this case look-up table 710). As result information is found pointing to the correct operation routine and to an operand for use in that routine. For example, 0x22b3 may be found, in which 0x22 points to a particular table. (Note that there may be an intermediate look-up table to go from 0x22 to a pointer address). The operation '0x22' is represented by a look-up table 720. In the result of look-up table 710 (0x22b3), the 0xb3 part is an encoded version of the immediate data, in this example of 0x12. The encoding may be done with an internal encoding. Next 0xb3 is looked-up in table 720. In this case the operation takes a single operand, say a negation operation. The 0xb3 is lookup to find the result, here 0xca. The result is already encoded with an internal encoding. The internal encoding may be the same, it may be a different internal encoding.

Look-up table 710 is an example of a look-up means comprised in the selector for looking-up an encoded instruction to select the corresponding operation routine.

The result 0xca may be put in a register or in a memory of the virtual machine device possibly for further use in operation routines or output The operation may be implemented as a single table as here. The operation may be implemented as a single table even if multiple operands are needed. In that case the multiple operands may be concatenated before lookup. The operation may be implemented as a network of table. The operation may also contain regular code. For example a jump, conditional or unconditional, may be implemented as regular code. Note that a conditional move may be implemented as a table also, wherein the conditional is an additional 1 bit operand.

Figure 5B:
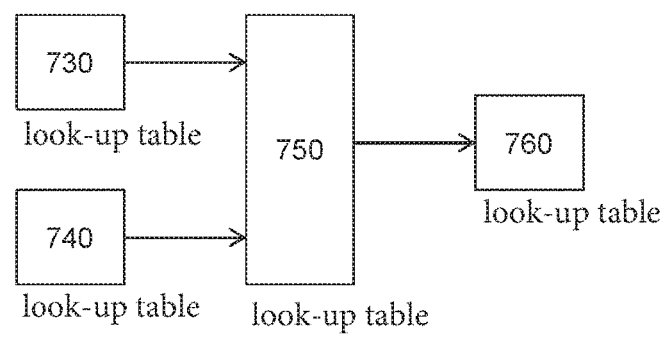
FIG. 5b illustrates constructing a look-up table for an operation.

FIG. 5b shows how a table may be constructed. In this case the table is for a two operand operation. Look-up table 750 represents is a look-up table of the plain operation, wherein simple all results of the operation for all possible inputs are listed in a reproducible order, say sorted. Look-up tables 730 and 740 represent internal decoding operation, for decoding an input. Look-up table 760 represents an internal encoding for the result. The decoding of 730 and 740 and/or the encodings of 760 may all correspond to the same internal encoding but this is not needed. Finally, all operations are composed. For example, one may go through the tables for all possible inputs and list all resulting results.

Figure 8:
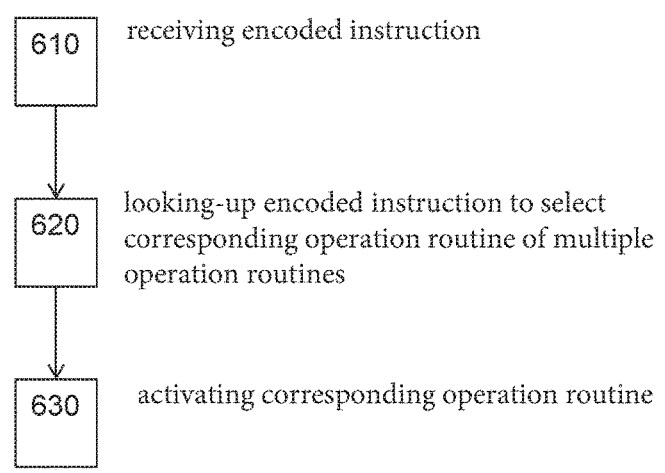
FIG. 8 is a flowchart illustrating a method according to the invention.

FIG. 8 illustrates a virtual machine method 600 according to the invention. Step 610 comprises receiving an encoded instruction, for example, by obtaining a sequence of encrypted instructions. The encoded instruction may be have been obtained by encoding a plain instruction with a code encoding. The sequence of encrypted instructions may have been obtained by encrypting each one of a sequence of plain instructions with a code encryption key. Plain instructions may be digital data items, e.g. represented as integer numbers. Step 620 comprises looking-up the encoded instruction to select a corresponding operation routine of multiple operation routine. The corresponding operation routine is configured to perform the plain instruction corresponding to the encoded instruction. Step 630 comprises activating the corresponding operation routine.

Typically encoding of the instructions will be performed on a different computer than steps 610, 620 and 630. The method is preferably a computer implemented method.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 620 and 630 may be executed, at least partially, in parallel. Moreover, a given step may not have finished completely before a next step is started.

A method according to the invention may be executed using software, which comprises instructions for causing a processor system to perform method 600. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A device comprising:
a memory to store multiple operation routines, wherein each operation routine is configured to perform a particular instruction;
at least one processor configured to:
receive an encoded instruction, the encoded instruction being obtained by encoding a plain instruction with a code encoding;
look-up a corresponding operation routine of the multiple operation routines based on the encoded instruction using a look-up table in the memory, the corresponding operation routine being configured to perform the plain instruction corresponding to the encoded instruction; and
receive input data encoded with a first encoding;
perform the corresponding operation routine based on the input data encoded with the first encoding to produce an output; and
encode the output with a second internal encoding.

2. The device according to claim 1, wherein to obtain the encoded instruction the at least one processor is configured to encode, with the code encoding, the plain instruction together with the input data for use with the plain instruction, the look-up table being configured for looking-up the encoded instruction to obtain the input data, the at least one processor being further configured to activate the corresponding operation routine with the input data.

3. The device according to claim 1, wherein to obtain the encoded instruction the at least one processor is configured to encode the plain instruction together with the input data in a single block of a block cipher.

4. The device according to claim 2, wherein the input data is encoded with an input encoding, before being encoded with the code encoding together with the plain instruction.

5. The device according to claim 1, wherein the at least one processor is further configured to:
receive further data for use by an operation routine, the further data being encoded with an input encoding; and
decode the data with an input decoding, and encode with an internal encoding.

6. The device according to claim 1, wherein to produce the output encoded with the second internal encoding the at least one processor is configured to:
decode the encoded data with a first decoding,
perform the plain instruction corresponding to the encoded instruction on the decoded encoded data to produce the output,
encode the output with the second internal encoding.

7. The device according to claim 6, wherein the input data encoded with the first encoding is any one of the following:
encoded immediate data, data encoded with an internal encoding obtained from the memory, data encoded with an internal encoding obtained from a register of the device.

8. The device according to claim 1, wherein the multiple operation routines comprises a recoding operation, the recoding operation corresponding to a recoding instruction, the recoding operation is configured to recode the input data encoded with the first encoding to data encoded with a second encoding.

9. The device according to claim 1, wherein the plain instructions correspond to java byte code.

10. A distributed execution system, comprising:
a memory comprising multiple operation routines, wherein each operation routine is configured to perform a particular instruction;
at least one processor configured to:
encode instructions with a code encoding;
receive an encoded instruction, the encoded instruction being obtained by encoding a plain instruction with a code encoding;
look-up a corresponding operation routine of the multiple operation routines based on the encoded instruction using a look-up table in the memory, the corresponding operation routine being configured to perform the plain instruction corresponding to the encoded instruction;
receive input data encoded with a first encoding;
perform the corresponding operation routine based on the input data encoded with the first encoding to produce an output; and
encode the output with a second internal encoding.

11. A method comprising:
receiving, by at least one processor, an encoded instruction, the encoded instruction being obtained by encoding a plain instruction with a code encoding;
looking-up, by the at least one processor, a corresponding operation routine of multiple operation routines based on the encoded instruction using a look-up table, the corresponding operation routine being configured to perform the plain instruction corresponding to the encoded instruction;
receiving input data encoded with a first encoding;
producing, by the at least one processor, an output based on the input data encoded with the first encoding; and
encoding the output with a second internal encoding.

12. A non-transitory computer readable medium having a computer program which, when executed, causes at least one processor to:
- receive an encoded instruction, the encoded instruction being obtained by encoding a plain instruction with a code encoding;
- look up a corresponding operation routine of multiple operation routines based on the encoded instruction, the corresponding operation routine being configured to perform the plain instruction corresponding to the encoded instruction;
- receive input data encoded with a first encoding;
- perform the corresponding operation routine based on the input data encoded with the first encoding to produce an output; and
- encode the output with a second internal encoding.

13. The device according to claim 1, wherein the look-up table comprises a single table or a table network.

14. A device comprising:
- a memory to store at least one lookup table comprising associations between plain instructions and encrypted instructions, wherein each encrypted instruction includes a plain instruction encrypted with a cryptographic key; and
- at least one processor configured to:
  - receive an encrypted instruction;
  - select a corresponding plain instruction using the at least one lookup table;
  - receive input data encoded with a first encoding;
  - execute the plain instruction corresponding to the encrypted instruction based on the input encoded with the first encoding; to produce an output; and
  - encode the output with a second internal encoding.

15. A method comprising:
- receiving, by an integrated circuit, an encrypted instruction, the encrypted instruction comprising a plain instruction encrypted with a cryptographic key;
- searching, by the integrated circuit, a memory with associations between encrypted instructions and plain instructions to find a plain instruction corresponding to the encrypted instruction;
- receiving input data encoded with a first encoding;
- executing, by the integrated circuit, the corresponding plain instruction based on the input data encoded with the first encoding; to produce an output; and
- encoding the output with a second internal encoding.

16. A non-transitory computer readable medium with instructions stored therein, which upon execution cause at least one processor to:
- receive an encrypted instruction, the encrypted instruction comprising a plain instruction encrypted with a cryptographic key;
- search a memory with associations between encrypted instructions and plain instructions to find a plain instruction corresponding to the encrypted instruction;
- receive input data encoded with a first encoding;
- execute the corresponding plain instruction based on the input data encoded with the first encoding to produce an output; and
- encode the output with a second internal encoding.

* * * * *